(12) United States Patent
Cai et al.

(10) Patent No.: US 9,813,538 B2
(45) Date of Patent: Nov. 7, 2017

(54) MALICIOUS CALL RECOGNITION METHOD AND APPARATUS

(71) Applicant: TENCENT TECHNOLOGY (SHENZHEN) COMPANY LIMITED, Shenzhen (CN)

(72) Inventors: Chaowei Cai, Shenzhen (CN); Hua Zhang, Shenzhen (CN); Bo Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/408,556

(22) Filed: Jan. 18, 2017

(65) Prior Publication Data

US 2017/0126874 A1    May 4, 2017

Related U.S. Application Data

(63) Continuation of application No. PCT/CN2016/072792, filed on Jan. 29, 2016.

(30) Foreign Application Priority Data

Feb. 27, 2015  (CN) .......................... 2015 1 0089138

(51) Int. Cl.
   *H04Q 7/22*     (2006.01)
   *H04M 1/663*    (2006.01)
   *H04M 3/42*     (2006.01)

(52) U.S. Cl.
   CPC ....... *H04M 1/663* (2013.01); *H04M 3/42059* (2013.01)

(58) Field of Classification Search
   CPC ........... H04M 1/633; H04M 3/42; H04Q 7/22
   See application file for complete search history.

(56) References Cited

U.S. PATENT DOCUMENTS

2002/0067809 A1    6/2002  Won

FOREIGN PATENT DOCUMENTS

| CN | 101304575   | * 11/2008 | ............... H04Q 7/22 |
| CN | 103413091 A |   11/2013 | |

(Continued)

OTHER PUBLICATIONS

The World Intellectual Property Organization (WIPO) International Search Report for PCT/CN2016/072792 Apr. 11, 2016 p. 1-13.

*Primary Examiner* — Myron K Wyche
(74) *Attorney, Agent, or Firm* — Anova Law Group, PLLC

(57) ABSTRACT

Embodiments of the present disclosure disclose a malicious call recognition method and apparatus, and belong to the field of mobile communication. The method includes: obtaining call detail record information of the call when a local end makes a call to a peer end, the call detail record information of the call including a call record of the local end within first preset duration that is closest to current time, and/or a call record of the peer end within the first preset duration that is closest to the current time; matching the call detail record information of the call with a malicious model corresponding to a malicious call event included in a preset malicious model library; and determining the call to be a malicious call if the malicious model that matches with the call detail record information of the call is found.

20 Claims, 4 Drawing Sheets

(56) References Cited

FOREIGN PATENT DOCUMENTS

| | | | | |
|---|---|---|---|---|
| CN | 104113626 | * | 10/2014 | ............ H04M 1/663 |
| CN | 104113626 A | | 10/2014 | |
| CN | 104735671 A | | 6/2015 | |

* cited by examiner

MALICIOUS CALL RECOGNITION METHOD AND APPARATUS

CROSS-REFERENCES TO RELATED APPLICATION

This application is a continuation of PCT Patent Application No. PCT/CN2016/072792, filed on Jan. 29, 2016, which claims priority to Chinese Patent Application No. 201510089138.8, filed with the Chinese Patent Office on Feb. 27, 2015 and entitled "MALICIOUS CALL RECOGNITION METHOD AND APPARATUS", the entire contents of all of which are incorporated herein by reference.

FIELD OF THE TECHNOLOGY

Embodiments of the present disclosure relate to the field of mobile communication, and in particular, to a malicious call recognition method and apparatus.

BACKGROUND OF THE DISCLOSURE

Currently, increasing lawbreakers make malicious behaviors, for example, committing phone scams on others, by using communications tools such as a mobile phone or a fixed-line phone, which brings economic losses to the others. Therefore, when a user receives a strange call or makes a strange call, it needs to be recognized whether the strange call is a malicious call. If the strange call is a malicious call, the user is reminded in time, thereby avoiding economic losses of the user.

In the existing technology, a malicious call recognition method is provided, which may be: providing, by a local end, a blacklist of phone numbers, the blacklist storing at least one malicious phone number, when a user makes a call by using a terminal, obtaining, by the local end, a phone number of the current call, and determining whether the phone number exists in the blacklist, and if the phone number exists in the blacklist, determining the current call to be a malicious call.

However, in the existing technology, whether a current call is a malicious call is determined according to a phone number of the current call, but currently, many lawbreakers modify phone numbers of their own phones to be phone numbers except blacklist phone numbers, for example, to be phone numbers of bureau of public security, by using a phone number modification software. In this case, whether the current call is a malicious call cannot be recognized by using the existing technology, which consequently results in a low accuracy of recognizing a malicious call. The disclosed method and apparatus are directed to solve one or more problems set forth above and other problems.

BRIEF SUMMARY OF THE DISCLOSURE

To resolve a problem in the existing technology, embodiments of the present disclosure provide a malicious call recognition method and apparatus. The technical solution is as follows.

According to an aspect, a malicious call recognition method is provided, the method including: obtaining call detail record information of the call when a local end makes a call to a peer end, the call detail record information of the call including a call record of the local end within first preset duration that is closest to current time, and/or a call record of the peer end within the first preset duration that is closest to the current time; matching the call detail record information of the call with a malicious model corresponding to a malicious call event included in a preset malicious model library; and determining the call to be a malicious call if the malicious model that matches with the call detail record information of the call is found.

According to another aspect, a malicious call recognition apparatus is provided, the method including: a first obtaining module, configured to obtain call detail record information of the call when a local end makes a call to a peer end, the call detail record information of the call including a call record of the local end within first preset duration that is closest to current time, and/or a call record of the peer end within the first preset duration that is closest to the current time; a matching module, configured to match the call detail record information of the call with a malicious model corresponding to a malicious call event included in a preset malicious model library; and a recognition module, configured to determine the call to be a malicious call if the malicious model that matches with the call detail record information of the call is found.

According to another aspect, a non-transitory computer readable storage medium storing computer instructions for implementing a malicious call recognition method is provided. The method may include: obtaining call detail record information of the call when a local end makes a call to a peer end, the call detail record information of the call comprising at least one of a call record of the local end within first preset duration that is closest to current time, and a call record of the peer end within the first preset duration that is closest to the current time; matching the call detail record information of the call with a malicious model corresponding to a malicious call event comprised in a preset malicious model library; and determining the call to be a malicious call if the malicious model that matches with the call detail record information of the call is found In the embodiments of the present disclosure, by matching call detail record information of a current call with a malicious model corresponding to a malicious call event included in a preset malicious model library, whether the current call is a malicious call is determined. Even if a lawbreaker modifies a call number of the current call to be other phone numbers except blacklist phone numbers, whether the current call is a malicious call can be accurately recognized by using the present disclosure, thereby improving accuracy of recognizing a malicious call.

Other aspects of the present disclosure can be understood by those skilled in the art in light of the description, the claims, and the drawings of the present disclosure.

BRIEF DESCRIPTION OF THE DRAWINGS

FIG. 3-1 is a schematic structural diagram of a malicious call recognition apparatus according to Embodiment 3 of the present disclosure;

FIG. 3-2 is a schematic structural diagram of another malicious call recognition apparatus according to Embodiment 3 of the present disclosure; and FIG. 3-3 is a schematic structural, diagram of a terminal according to Embodiment 3 of the present disclosure.

DESCRIPTION OF EMBODIMENTS

To make the objectives, technical solutions, and advantages of the present disclosure more clear, the following further describes the implementation manners of the present disclosure in detail with reference to the accompanying drawings.

When a local end receives a strange call or makes a strange call, the local end needs to recognize whether the received strange call or the made strange call is a malicious call, and if it is, the strange call may be reminded or intercepted, so as to prevent lawbreakers from committing malicious behaviors such as a scam to a user which results in economic losses to the user. In embodiments of the present disclosure, whether the strange call is the malicious call can be recognized by using the solution provided in any one of the following embodiments.

Embodiment 1

Figure 1:
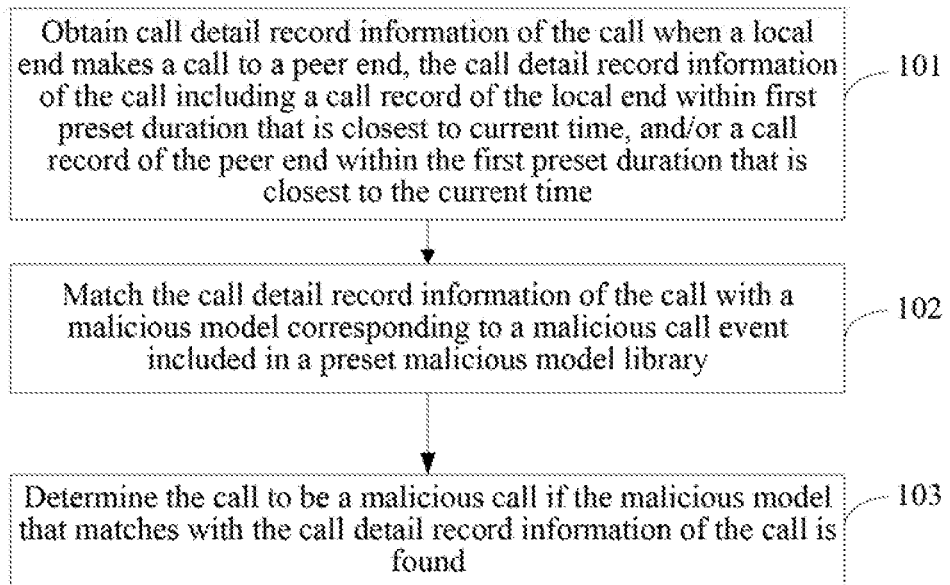
FIG. 1 is a flowchart of a malicious call recognition method according to Embodiment 1 of the present disclosure.

An embodiment of the present disclosure provides a malicious call recognition method, and referring to FIG. 1, the method may include the following steps.

Step 101: Call detail record information of the call is obtained when a local end makes a call to a peer end, the call detail record information of the call including a call record of the local end within first preset duration that is closest, to current time, and/or a call record of the peer end within the first preset duration that is closest to the current time.

Step 102: The call detail record information of the call may be matched with a malicious model corresponding, to a malicious call event included in a preset malicious model library.

Step 103: The call is determined to be a malicious call if the malicious model that matches with the call detail record information of the call is found.

In this embodiment of the present disclosure, by matching call detail record information of a current call with a malicious model corresponding to a malicious call event included in a preset malicious model library, whether the current call is a malicious call is determined. Even if a lawbreaker modifies a call number of the current call to be other phone numbers except blacklist phone numbers, whether the current call is a malicious call can be accurately recognized by using the present disclosure, thereby improving accuracy of recognizing a malicious call.

Embodiment 2

An embodiment of the present disclosure provides a malicious call recognition method, and the method is executed by a local end. When the local end makes a call to a peer end, whether the call is a malicious call may be recognized by using the malicious call recognition method provided in this embodiment of the present disclosure. If the call is the malicious call, a user is reminded in time, thereby avoiding economic losses of the user. It is easy to understand the malicious call recognition processing performed on a strange call in the solution. If a phone number is a frequently-used phone number of a user or a number saved by the user, it may be determined that a call made by using the phone number is a non-malicious call.

Figure 2:
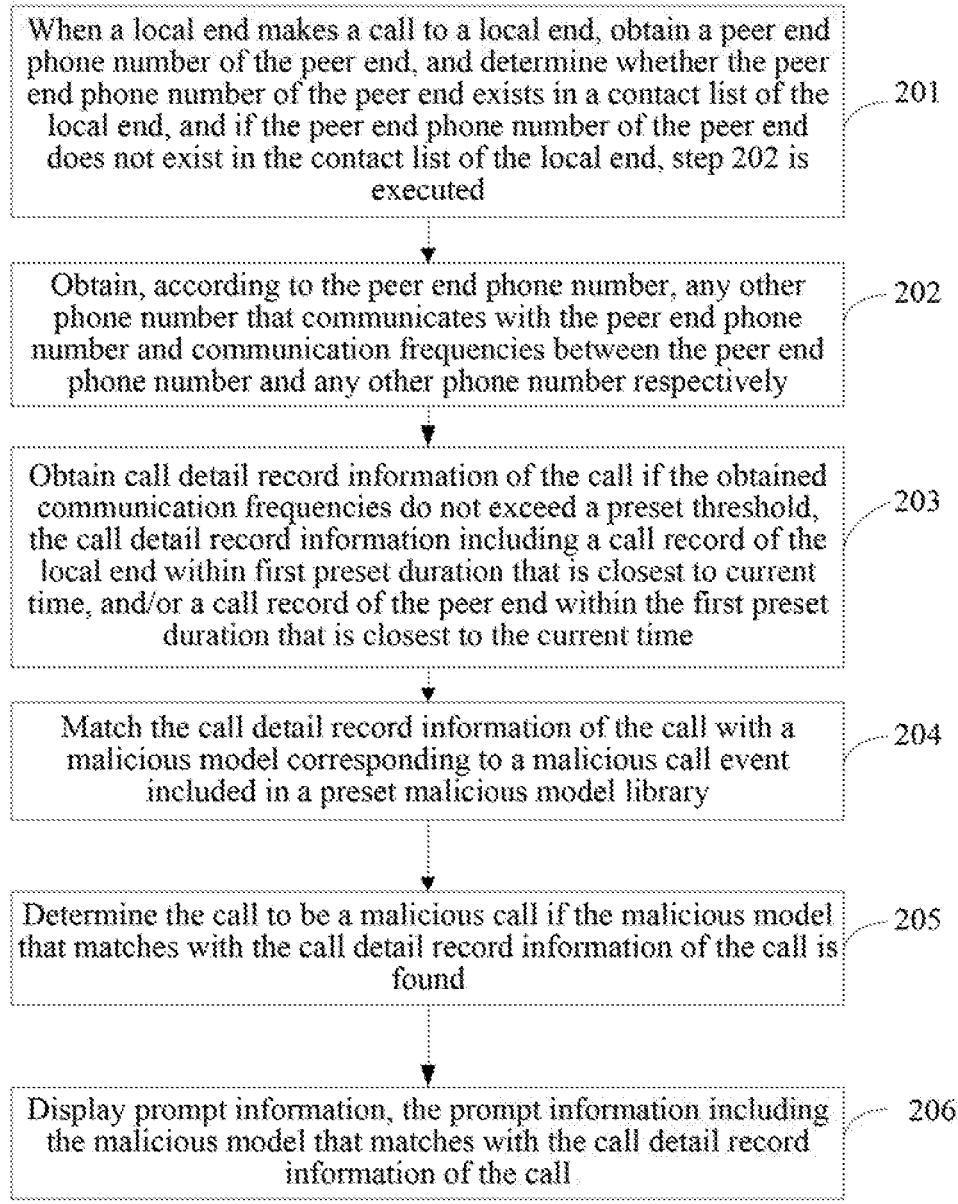
FIG. 2 is a flowchart of a malicious call recognition method according to Embodiment 2 of the present disclosure.

Referring to FIG. 2, the method may include the following steps.

Step 201: When a local end makes a call to a peer end, a peer end phone number of the peer end is obtained, whether the peer end phone number of the peer end exists in a contact list of the local end is determined, and if the peer end phone number of the peer end does not exist in the contact list of the local end, step 202 is executed.

When the local end makes a call to the peer end, also namely, when the local end dials the peer end phone number or the peer end dials a local end phone number of the local end, the local end obtains the peer end phone number, and whether the peer end phone number exists in the contact list of the local end may be determined. If the peer end phone number exists in the contact list of the local end, it may be determined that the call is not a malicious call; or if the peer end phone number does not exist in the contact list of the local end, it is determined that the call may be a malicious call, and step 202 is executed.

Step 202: According to the peer end phone number, phone numbers communicated with the peer end phone number may be obtained, and communication frequencies between the peer end phone number and the phone numbers respectively may be obtained.

A cycle of use of a malicious phone number corresponding to a malicious call is short. Therefore, usually, the malicious phone number does not have a buddy contact, the buddy contact being a contact that is frequently contacted. Therefore, whether the phone number has a buddy contact may be determined by means of communication frequencies between the peer end phone number and any other phone number, and whether a call is a malicious call may be further determined; and if the peer end phone number has a buddy contact, it is determined that the call is not the malicious call; or if the peer end phone number does not have a buddy contact, it is determined that the call may be the malicious call, and step 203 is executed.

Step 202 may be implemented by means of the following step (1) to (3), including: (1): sending the peer end phone number to a server, so that the server obtains a call record of the peer end phone number according to the peer end phone number.

The server stores all call records of each phone number. In this step, after the server receives the peer end phone number sent by the local end, the server may obtain all call records of the peer end phone number, and send the call records of the peer end phone number to the local end, and executes step (2) subsequently.

It should be noted that when a lawbreaker intends to commit a malicious behavior on a user, for example, committing a phone scam on the user, the lawbreaker may commit a scam in recent several days by dialing the local end phone number, but may not continue the scam on a same user for a long time. Therefore, the local end may obtain the call records of the peer end phone number in the recent several days, also namely, obtain the call records within second preset duration that is closest to current time. The call records include airtime (e.g., the time stamp that a call is initiated), call duration, and a phone number for each phone call.

The second preset duration may be set and modified as required. In this embodiment of the present disclosure, the second preset duration is not limited in detail, for example, the second preset duration may be a week.

(2): The call record of the peer end phone number, sent by the server, may be received, and from the call record of the peer end phone number, any other phone number that communicates with the peer end phone number is obtained.

The call record may include a call number, and the local end may obtain from the call record of the peer end phone number, any other phone number that communicates with the peer end number except the local end phone number.

(3): According to the call record of the peer end phone number, the communication frequencies between the peer end phone number and any other phone number respectively may be counted.

Specifically, a communication quantity and an airtime interval of the peer end phone number that respectively communicates with any other phone number are obtained from the call record of the peer end phone number. The airtime interval is a difference of time between a first call and a last call recorded in the call record. For example, in the call record of the peer end phone number, it may be obtained that a first call between the peer end phone number and a phone number A is on January 2, and a last call between the peer end phone number and the phone number A is on January 16, so that the airtime interval is 15 days. According to the communication quantity and the airtime interval of the peer end phone number that respectively communicates with any other phone number, communication frequencies between the peer end phone number and any other phone number respectively are calculated. Based on the example, if the communication quantity between the peer end phone number and the phone number A from January 2 to January 16 is 30, it may be determined that the communication frequency is twice per day.

Further, whether the obtained communication frequencies do not exceed a preset threshold is determined. If the obtained communication frequencies do not exceed the preset threshold, it may be determined that the peer end phone number has no buddy contact, and the call may be the malicious call, and step 203 is executed; or if the obtained communication frequencies have one or more communication frequencies greater than the preset threshold, it is determined that the phone number that has a communication frequency greater than the preset threshold is a buddy contact of the peer end phone, so that it may be determined that the call is not the malicious call.

Optionally, the local end may also directly obtain a quantity of buddy contacts of the peer end phone number from the server, so as to determine whether the call may be the malicious call. Correspondingly, step 202 may be processed as follows: obtaining a quantity of buddy contacts of the peer end phone number according to the peer end phone number.

The server stores a buddy contacts list of each call. After the server receives the peer end phone number sent by the local end, the server may obtain the buddy contacts list of the peer end phone number, count the quantity of buddy contacts of the peer end phone number, and send the quantity of buddy contacts to the local end. In some embodiments, the server may determine the buddy contacts lists of a phone number according to the communication frequencies counted from the corresponding call record.

Step 203: Call detail record information of the call may be obtained if the obtained communication frequencies do not exceed a preset threshold, the call detail record information including a call record of the local end within first preset duration that is closest to current time, and/or a call record of the peer end within the first preset duration that is closest to the current time.

The call record at least includes airtime, call duration and a phone number; and may further include information such as a home location of the phone number.

In this step, a call record of the local end within first preset duration that is closest to current time is obtained as call detail record information of the call; or a call record of the peer end within first preset duration that is closest to current time is obtained as call detail record information of the call; or both a call record of the local end within first preset duration that is closest to current time and a call record of the peer end within the first preset duration that is closest to the current time are obtained as call detail record information of the call, and step 204 is executed subsequently.

The step of obtaining a call record of the local end within first preset duration that is closest to current time may be: sending the local end phone number and first preset duration to the server; receiving, by the server, the local end phone number sent by the local end, and obtaining the call record of the local end from a corresponding relationship between the phone number and the call record; obtaining a call record of the local end from the call record of the local end within the first preset duration that is closest to current time, and sending the call record of the call of the local end within the first preset duration that is closest to the current time to the local end, and receiving, by the local end, the call record of the call of the local end, sent by the server within the first preset duration that is closest to the current time.

Correspondingly, the step of obtaining a call record of the peer end within first preset duration that is closest to current time may be: sending the peer end phone number and first preset duration to the server; receiving, by the server, the peer end phone number sent by the local end, and obtaining the call record of the peer end from a corresponding relationship between the phone number and the call record; obtaining a call record of the peer end from the call record of the peer end within first preset duration that is closest to current time, and sending the call record of the call of the peer end within the first preset duration that is closest to the current time to the local end, and receiving, by the local end, the call record of the call of the peer end, sent by the server within the first preset duration that is closest to the current time.

The first preset duration may be set and modified as required. For example, the first preset duration may be a week or three days.

Sending the quantity of buddy contacts is processed as above, correspondingly, step 203 may be processed as follows: if the quantity of buddy contacts of the peer end phone number does not exceed a preset quantity threshold, call detail record information of the call is obtained. The call detail record information includes a call record of the local end within first preset duration that is closest to current time, and/or a call record of the peer end within the first preset duration that is closest to the current time.

Step 204: The call detail record information of call may be matched with a malicious model corresponding to a malicious call event included in a preset malicious model library.

The local end stores the preset malicious model library, and the malicious model library includes one or more malicious models corresponding to the malicious call event. The call detail record information of the call is matched with the malicious models included in the preset malicious model library to determine whether the call is the malicious call.

Each malicious model corresponding to the malicious call event describes a process in which the lawbreaker commits a malicious behavior by using a malicious call, and further defines a malicious condition that the malicious behavior meets.

Specifically, step 204 may be implemented by means of the following step (1) to (3), including: (1): extracting, from a first malicious model, a malicious condition defined by the first malicious model, the first malicious model being any malicious model in the preset malicious model library.

Any malicious model is selected arbitrarily from the preset malicious model library, the selected malicious model is used as the first malicious model, and a malicious condition corresponding to the first malicious model is extracted from the first malicious model.

For example, the preset malicious model library includes three malicious models, which respectively are a suddenly-increased malicious model, a leader malicious model, and an event malicious model.

A process described by the suddenly-increased malicious model is: usually, a lawbreaker makes a great quantity of calls in recent several days. Therefore, a malicious condition corresponding to the suddenly-increased malicious model is that the quantity of calls within third preset duration that is closest to current time reaches a preset quantity.

A process described by the leader malicious model a lawbreaker makes a call to a user on a first day by using a strange phone number and tells the user that he is a leader (e.g., manager, boss) of the user, and on a second day or a third day, the lawbreaker makes a call to the user again by using the strange number and tells the user that he has something emergency and needs the user to help transfer money to his accounts, and further commits a malicious behavior such as a scam on the user. Therefore, a malicious condition defined by the leader malicious model is that the call is the second call or the third call, and a difference of time between the call and the first call is within fourth preset duration.

A process described by the event malicious model is: a lawbreaker usually makes up stories, connects the stories to make the user to believe him, and further commits a malicious behavior such as a scam on the user. For example, the lawbreaker makes a call to the user by using a special phone number and tells the user that a file is not delivered successfully. Tens of minutes later, the lawbreaker makes a call to the user by using a phone number of a bureau of public security (e.g., a phone number disguised as a police station phone number), and claims that he is a police officer and a file is not delivered successfully. Another tens of minutes later, the lawbreaker makes a call to the user by using as phone number of a procuratorate (e.g., district attorney), and continuously tells that a user file is not delivered successfully. Because the lawbreaker uses phone numbers of the bureau of public security and the procuratorate, and tells things all about that a file is not delivered successfully, the user may believe at that time. When the lawbreaker commits a malicious behavior such as a scam, airtime of the several calls made by the lawbreaker is in the recent one or two days. Therefore, a malicious condition defined, by the event malicious model is that airtime of phone number that satisfies a preset format is within fifth preset duration that is closest to the current time.

The third preset duration, the fourth preset duration, the fifth preset duration, and the preset quantity may be set and modified as required. For example, the third preset duration is a week or two weeks, the fourth preset duration is two days, the fifth preset duration is two days, and the preset quantity is 1000.

(2): Whether the call detail record information of the call satisfies a malicious condition is determined.

Whether the call detail record information of the call satisfies the definition of the malicious condition corresponding to the first malicious model is determined according to the call detail record information of the call; and if the call detail record information of the call satisfies the definition of the malicious condition corresponding to the first malicious model, step (3) is executed; or if the call detail record information of the call does not satisfy the definition of the malicious condition corresponding, to the first malicious model, it is determined that the call is not the malicious call.

For example, a malicious model, such as the suddenly-increased malicious model, is selected from the preset malicious model library. Assuming that the suddenly-increased malicious model defines the third preset duration to a week and the preset quantity to 1000, whether a quantity of communication of the peer end phone number reaches 1000 within a latest week that is closest to the current time is determined according to the call detail record information of the call, and if the quantity of communication of the peer end phone number reaches 1000, it is determined that the call detail record information of the call satisfies the definition of the malicious condition corresponding to the suddenly-increased malicious model; or if the quantity of communication of the peer end phone number does not reach 1000, it is determined that the call detail record information of the call does not satisfy the definition of the malicious condition corresponding to the suddenly-increased malicious model.

When the call detail record information of the call does not match with the suddenly-increased malicious model, a malicious model such as the leader malicious model, is re-selected from the preset malicious model library. Assuming that the leader malicious model defines the fourth preset duration to two days, whether the call is the second or the third call, and whether the difference of time between the call and the first call is within two day are determined according to the call detail record information of the call, and if the call is the second or the third call, and the difference of time between the call and the first call is within two days, it is determined that the call detail record information of the call satisfies the definition of the malicious condition corresponding to the leader malicious model; or if the call is the first call, it is determined that the call detail record information of the call does not satisfy the definition of the malicious condition corresponding to the leader malicious model.

When the call detail record information of the call matches with neither the suddenly-increased malicious model nor the leader malicious model, a malicious model such as the event malicious model, is re-selected from the preset malicious model library. The event malicious model defines the fifth preset duration to two days, and the call detail record information in which a phone number satisfies the preset format is selected from the call detail record information. The call detail record information at least includes airtime, and may further include information such as call duration and a home location of the phone number. Whether airtime of as phone number that satisfies the preset format is within recent two days is determined according to the obtained call detail record information, and if the airtime of the phone number that satisfies the preset format is within the recent two days, it is determined that the call detail record information of the call satisfies the definition of the malicious condition corresponding to the event malicious model; or if the airtime of the phone number that satisfies the preset format is not within airtime of the recent two days, it is determined that the call detail record information of the call does not satisfy the definition of the malicious condition corresponding to the event malicious model.

The preset format may be set and modified as required. In this embodiment of the present disclosure, the preset format is not specifically limited. For example, the preset format may be: +a phone number (e.g., phone number having a "+"

sign in the beginning), a yellow page phone number, or the like. The yellow page phone number refers to phone numbers of government, commercial and industrial enterprises, such as a bank, a police station, a district attorney, etc. It can be understood that, a lawbreaker may modify his original phone number to be appeared as yellow page phone number on the local end.

For example, the obtained call detail record information includes: a lawbreaker makes a call to the local end at 10:12 by using +18588567356, a phone number that satisfies the preset format, and the call automatically plays a voice telling that as file is not delivered successfully and the call is transferred, to manual service if the user presses 9; the lawbreaker makes a call to a local phone at 10:23 by using +0195852211, at phone number that satisfies the preset format and claims himself to be a police officer; the lawbreaker makes a call to the local phone at 11:38 by using 0215660811, a phone number of the Baoshan police station of Shanghai Municipal Bureau of Public Security; the lawbreaker makes a call to the local phone at 12:02 by using 021114, a customer service phone number of the Shanghai phone number directory inquiry platform; and the lawbreaker makes a call to the local phone at 12:16 by using 02124024000, a phone number of the procuratorate.

The phone number +18588567356 and +0195852211 satisfy the preset format "+a phone number", the phone number "0215660811", "021114", and "02124024000" that are phone numbers in the yellow pages, also satisfy the preset format. In addition, airtime corresponding to these phone numbers is on a same day, satisfying the fifth preset duration defined by the event malicious model. Therefore, the call detail record information of the call satisfies the definition of the malicious condition corresponding to the event malicious model.

(3): The call detail record information of the call is determined to match with the first malicious model if the call detail record information of the call satisfies the definition of the malicious condition.

If the call detail record information of the call satisfies the definition of the malicious condition, it is determined that a malicious model that matches with the call detail record information of the call is found, also namely, the malicious model of the call is the first malicious model, and step 205 is executed.

Before the step, the local end may download the preset malicious model library from the server and stores the preset malicious model library, and every sixth preset duration, the local end downloads a latest preset malicious model library from the server, and updates the preset malicious model library stored by the local end to a latest preset malicious model library. Alternatively, when the server updates the preset malicious model library, the server sends a notification message to the local end and notifies the local end that the preset malicious model has been updated. The local end downloads a latest preset malicious model library from the server according to the notification message and updates the malicious model library stored locally to be the latest preset malicious model library.

The sixth preset duration may be set and modified as required. For example, the preset duration may be two weeks or a month.

The server generates the preset malicious model library in advance, and as specific generation process is as follows: obtaining call detail record information of the malicious call submitted by the terminal, extracting malicious rules according to the call detail record information of the malicious call, and organizing the malicious rules to be the malicious model. The server may also receive malicious rules input by the user, and organize the malicious rules to be the malicious model.

Step 205: The call may be determined to be a malicious call if the malicious model that matches with the call detail record information of the call is found.

If the call is determined to be the malicious call, step 206 is executed.

Step 206: A prompt information (e.g., a warning message) may be presented on the local end. For example, if the call is determined to be a malicious call during the phone call, the local end may vibrate, play a warning voice message through the headphone/speaker, and/or display a warning message on the display screen of the local end. If the call is determined to be a malicious call after the phone call is finished, a notification may be generated on the local end, and displayed to the user. Further, if the same phone number calls again, the screen may display a corresponding warning in the incoming phone call interface, so that the user may notice the warning before picking up the call.

In some embodiments, the prompt information may include the type of the malicious model that matches with the call detail record information of the call, or the reason that the call detail record information is determined to be malicious. For example, the prompt information may be "the caller has made 1234 calls in the past two days, it matches the suddenly-increased malicious model and is flagged as malicious, please be aware," or "you have received four calls today from phone numbers satisfying preset formats, the activities match an event malicious model, please be aware."

The prompt information is displayed to the user, so that the user is reminded that the call is the malicious call, losses of interests of the user is avoided, and the malicious model that matches with the call detail record information of the call may be displayed. Further, the server may record the related information, alert other local end users when the same phone number calls, and update the preset malicious model library.

It can be understood that, in some embodiments, steps 201-206 may be implemented on the phone at the local end, and specifically, by the phone call application embedded in the phone, or a standalone application/plug-in application associated with the phone call application. In some embodiments, some steps may be implemented an the server, other steps may be implemented on the phone at the local end, the server and the phone may communicate with each other to implement the malicious call recognition process. In one example, steps 201 and 206 may be implemented on the phone, and steps 202-205 may be implemented by the server. In another example, steps 201, 204, and 206 may be implemented on the phone, and steps 202, 203, and 205 may be implemented by the server.

In this embodiment of the present disclosure, by matching call detail record information of a current call with a malicious model corresponding to a malicious call event included in a preset malicious model library, whether the current call is a malicious call is determined. Even if a lawbreaker modifies a call number of the current call to be other phone numbers except blacklist phone numbers, whether the current call is a malicious call can be accurately recognized by using the present disclosure, thereby improving accuracy of recognizing a malicious call.

Embodiment 3

Figures 1, 3:
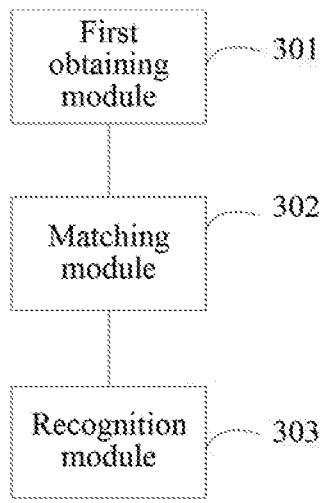
Figures 2, 3:
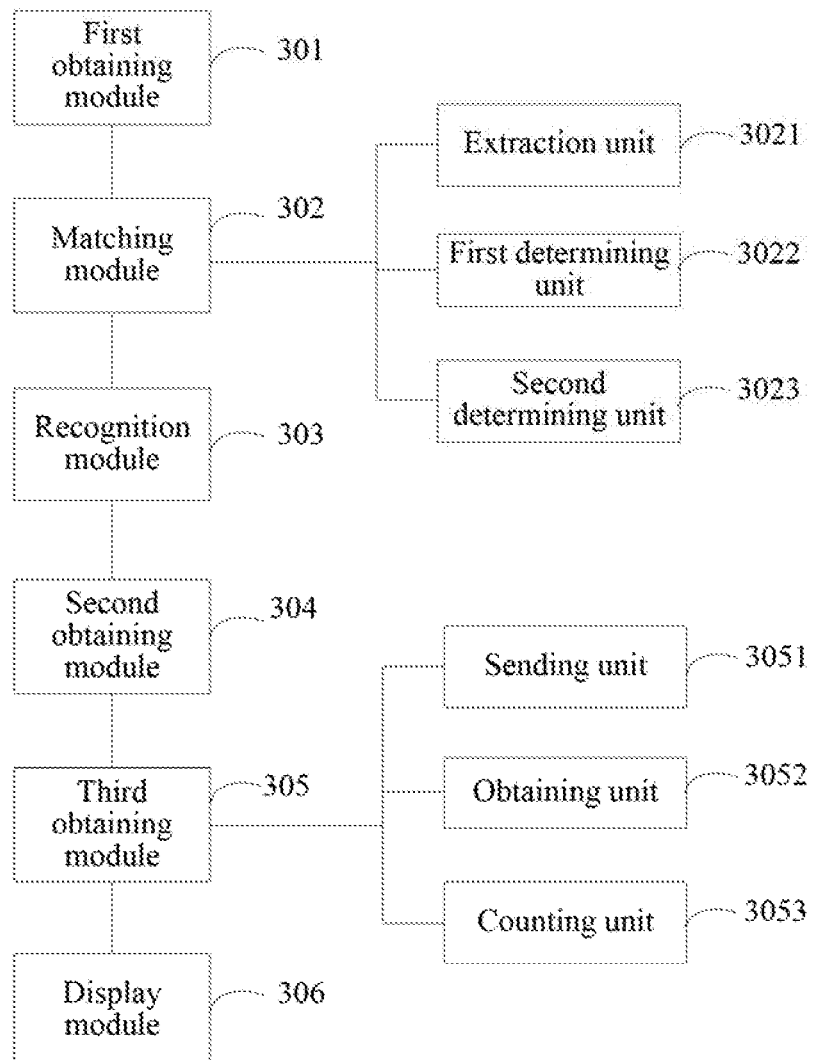
Figure 3:
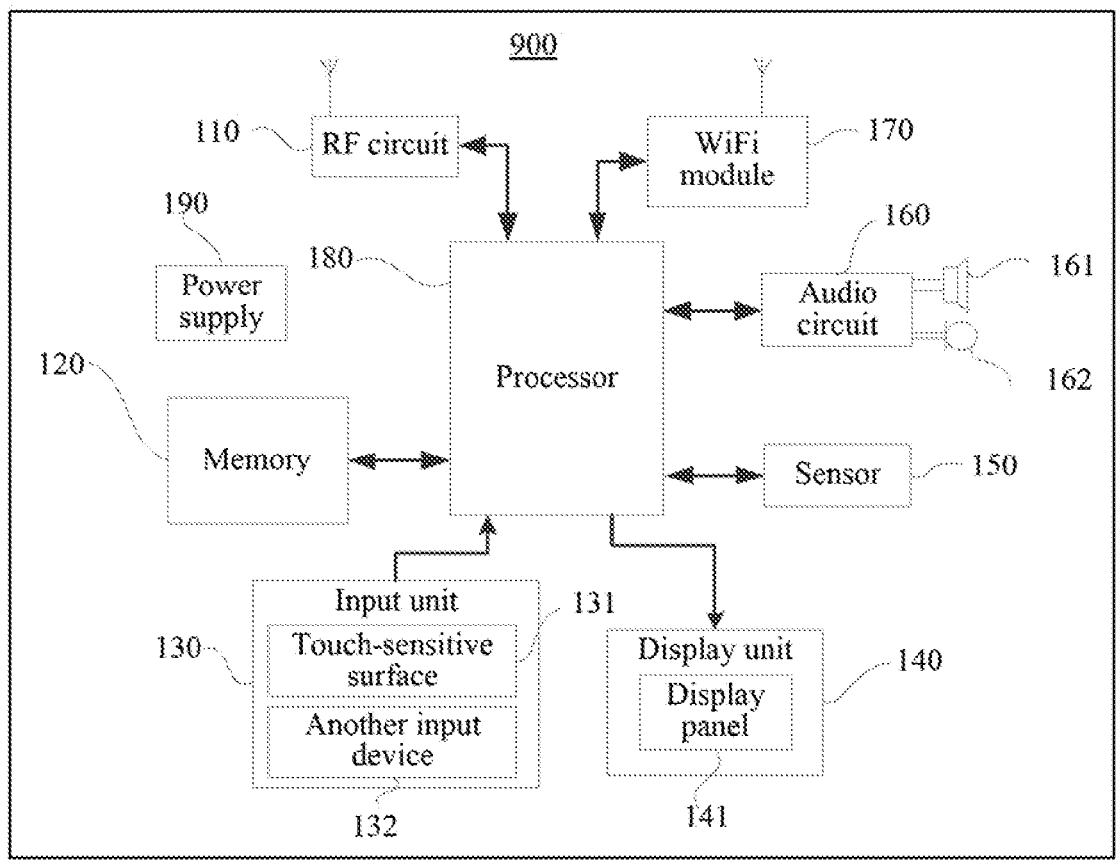

An embodiment of the present disclosure provides a malicious call recognition apparatus, and referring to FIG. 3, the apparatus includes: a first obtaining module 301, configured to obtain call detail record information of the call when a local end makes a call to a peer end, the call detail record information of the call including a call record of the local end within first preset duration that is closest to current time, and/or a call record of the peer end within the first preset duration that is closest to the current time; a matching module 302, configured to match the call detail record information of the call with a malicious model corresponding to a malicious call event included in a preset malicious model library; and a recognition module 303, configured to determine the call to be a malicious call if the malicious model that matches with the call detail record information of the call is found. In one embodiment, the malicious call recognition apparatus may be integrated with the phone at the local end. In another embodiment, the malicious call recognition apparatus may be implemented by the local end and a server connected to the local end. In some embodiments, the call detail record information may be obtained from the local end and/or from a server maintaining call records.

Referring to FIG. 3-2, the matching module 302 includes: an extraction module 3021, configured to extract a malicious condition from a first malicious model, the first malicious model being any malicious model in the preset malicious model library; a first determining unit 3022, configured to determine whether the call detail record information of the call satisfies a definition of the malicious condition; and a second determining unit 3023, configured to determine that the call detail record information of the call matches with the first malicious model if the call detail record information of the call satisfies the definition of the malicious condition.

Further, the apparatus further includes: a second obtaining module 304, configured to obtain a peer end phone number of the peer end; and a third obtaining module 305, configured to obtain, according to the peer end phone number, any other phone number that communicates with the peer end phone number and communication frequencies between the peer end phone number and any other phone number respectively; the first obtaining module 301 being configured to execute the step of obtaining call detail record information of the call, if the obtained communication frequencies do not exceed a preset threshold.

Further, the third obtaining module 305 includes: a sending unit 3051, configured to send the peer end phone number to a server, so that the server obtains a call record of the peer end phone number according to the peer end phone number; an obtaining unit 3052, configured to receive the call record sent by the server, and obtain from the call record any other phone number that communicates with the peer end phone number; and a counting unit 3053, configured to count, according to the call record, the communication frequencies between the peer end phone number and any other phone number respectively.

Further, the apparatus further includes: a fourth obtaining module, configured to obtain a peer end phone number of the peer end; and a fifth obtaining module, configured to obtain a quantity of buddy contacts of the peer end phone number according to the peer end phone number; the first obtaining, module being configured to execute the step of obtaining the call detail record information of the call, if the quantity of buddy contacts of the peer end phone number does not exceed a preset quantity threshold.

Further, the apparatus further includes: a display module 306, configured to display prompt information, the prompt information including the malicious model that matches with the call detail record information of the call.

In this embodiment of the present disclosure, by matching call detail record information of a current call with a malicious model corresponding to a malicious call event included in a preset malicious model library, whether the current call is a malicious call is determined. Even if a lawbreaker modifies a call number of the current call to be other phone numbers except blacklist phone numbers, whether the current call is a malicious call can be accurately recognized by using the present disclosure, thereby improving accuracy of recognizing a malicious call.

A phone, as used herein, may refer to any appropriate user terminal with certain computing and phone call capabilities. The phone may be used at the local end or the peer end. A server, as used herein, may refer to one or more server computers configured to provide certain server functionalities, e.g., network data storage and database management. A server may also include one or more processors to execute computer programs in parallel. The server may store all call records of each phone number. The phone and the server may communicate through a communication network. The communication network may include any appropriate type of communication network for providing network connections to the server and the phone or among multiple servers or phones. For example, the communication network may include the Internet or other types of computer networks or telecommunication networks, either wired or wireless.

Referring to FIG. 3-3, FIG. 3-3 shows a schematic structural diagram of a terminal according to an embodiment of the present disclosure. The terminal provides a running environment for the malicious call recognition apparatus provided in the embodiment 3. The phone and the server may be implemented by the computing platform shown in FIG. 3-3.

The terminal 900 may include components such as an RF (Radio Frequency, radio frequency) circuit 110, a memory 120 including one or more computer readable storage media, an input unit 130, a display unit 140, a sensor 150, an audio circuit 160, a WiFi (wireless fidelity, wireless fidelity) module 170, a processor 180 including one or more processing cores, and a power supply 190. A person skilled in the art may understand that the structure of the terminal shown in FIG. 3-3 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, after the RF circuit 110 receives downlink information from a base station, the RF circuit 110 delivers the downlink information to one or more processors 180 for processing, and sends related uplink data to the base station. Usually, the RF circuit 110 includes, but is not limited to, an antenna, at least one amplifier, a tuner, one or more oscillators, a subscriber identity module (SIM) card, at transceiver, a coupler, an LNA (Low Noise Amplifier, low noise amplifier), and a duplexer. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 900, and the like. In addition, the memory 120 may include a high speed random access memory, and may also include a non-volatile memory, such as at least one magnetic disk storage device, a flash memory, or another volatile solid-state storage device. Correspondingly, the memory 120 may further include a memory controller, so as to provide access of the processor 180 and the input unit 130 to the memory 120.

The input unit 130 may be configured to receive input figure or character information, and generate a keyboard, mouse, joystick, optical or trackball signal input related to a user setting and function control. Specifically, the input unit 130 may include a touch-sensitive surface 131 and another input device 132. The touch-sensitive surface 131, which may also be referred to as a touch display screen or a touch panel, may collect a touch operation of a user on or near the touch-sensitive surface (such as an operation of a user on or near the touch-sensitive surface 131 by using any suitable object or attachment, such as a finger or a touch pen), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, sends the touch point coordinates to the processor 180, and receives a command sent by the processor 180 and executes the command. In addition, the touch-sensitive surface 131 may be a resistive, capacitive, infrared, or surface sound wave type touch-sensitive surface. In addition to the touch-sensitive surface 131, the input unit 130 may further include another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 900. The graphical user interfaces may be formed by a graph, a text, an icon, a video, or any combination thereof. The display unit 140 may include a display panel 141. Optionally, the display panel 141 may be configured by using an LCD (Liquid Crystal Display, liquid crystal display), an OLED (Organic Light-Emitting Diode, organic light-emitting diode), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor provides corresponding visual output on the display panel 141 according to the type of the touch event. Although, in FIG. 3-3, the touch-sensitive surface 131 and the display panel 141 are used as two separate parts to implement input and output functions, in some embodiments, the touch-sensitive surface 131 and the display panel 141 may be integrated to implement the input and output functions.

The terminal 900 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal 900 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 900, are not further described herein.

The audio circuit 160, a loudspeaker 161, and a microphone 162 may provide audio interfaces between the user and the terminal 900. The audio circuit 160 may convert received audio data into an electric signal and transmit the electric signal to the loudspeaker 161. The loudspeaker 161 converts the electric, signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 900.

WiFi is as short distance wireless transmission technology. The terminal 900 may help, by using the WiFi module 170, the user to receive and send e-mails, browse a webpage, access streaming media, and so on, which provides wireless broadband Internet access for the user. Although FIG. 3-3 shows the WiFi module 170, it may be understood that the WiFi module 170 is not a necessary component of the terminal 900, and when required, the wireless communications unit may be omitted as long as the scope of the essence of the present disclosure is not changed.

The processor 180 is the control center of the terminal 900, and is connected to various parts of the mobile phone by using various interfaces and lines. By running or executing the software program and/or module stored in the memory 120, and invoking data stored in the memory 120, the processor 180 performs various functions and data processing of the terminal 900, thereby performing overall monitoring on the mobile phone. Optionally, the processor 180 may include the one or more processing, cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal 900 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 900 may further include a camera, a Bluetooth module, and the like, and details are not further described herein. Specifically, in this embodiment, the display unit of the terminal 900 is a touch screen display, and the terminal 900 further includes a memory and one or more programs. The one or more programs are stored in the memory, and are configured to be executed by one or more processors. The one or more programs include instructions for performing the following operations.

Step 401: Obtaining a peer end phone number of a peer end.

Step 402: Obtaining, according to the peer end phone number, any other phone number that communicates with the peer end phone number and communication frequencies between the peer end phone number and any other phone number respectively.

Step 402 may further include: sending the peer end phone number to a server, so that the server obtains a call record of the peer end phone number according to the peer end phone number; receiving the call record sent by the server, and obtaining from the call record any other phone number that communicates with the peer end phone number; and counting, according to the call record, the communication frequencies between the peer end phone number and any other phone number respectively.

Step 403: Executing step 404 if the obtained communication frequencies do not exceed a preset threshold.

Step 404: Obtaining call detail record information of the call when a local end makes a call to the peer end, the call detail record information of the call including a call record of the local end within first preset duration that is closest to current time, and/or a call record of the peer end within the first preset duration that is closest to the current time.

Step 405: Matching the call detail record information of the call with a malicious model corresponding to a malicious call event included in a preset malicious model library.

Step 405 may further include: extracting a malicious condition from a first malicious model, the first malicious model being any malicious model in the preset malicious model library; determining whether the call detail record information of the call satisfies a definition of the malicious condition; and determining that the call detail record information of the call matches with the first malicious model, if the call detail record information of the call satisfies the definition of the malicious condition.

Step 406: Determining the call to be a malicious call if the malicious model that matches with the call detail record information of the call is found.

Step 407: Presenting prompt information, the prompt information including the malicious model that matches with the call detail record information of the call.

In this embodiment of the present disclosure, by matching call detail record information of a current call with a malicious model corresponding to a malicious call event included in a preset malicious model library, whether the current call is a malicious call is determined. Even if a lawbreaker modifies a call number of the current call to be other phone numbers except blacklist phone numbers, whether the current call is a malicious call can be accurately recognized by using the present disclosure, thereby improving accuracy of recognizing a malicious call.

It should be noted that: when the malicious call recognition apparatus provided in the foregoing embodiments recognizes a malicious call, it is illustrated with an example of division of each function module. In the practical application, the function distribution may be finished by different function modules according to the requirements, that is, divide the internal structure of the equipment into different function modules, so as to complete all or part of the functions described above. In addition, the malicious call recognition apparatus provided in the foregoing embodiments and the embodiments of the malicious call recognition method belong to the same conception, and the specific implementation process is described in the method embodiments in detail, which is not described here again.

A person of ordinary skill in the art may understand that all or some of the steps of the embodiments may be implemented by hardware or a program instructing related hardware. The program may be stored in a computer readable storage medium. The storage medium may be a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A malicious call recognition method, comprising:
   obtaining call detail record information of the call when a local end makes a call to a peer end, the call detail record information of the call comprising at least one of a call record of the local end within first preset duration that is closest to current time, and a call record of the peer end within the first preset duration that is closest to the current time;
   matching the call detail record information of the call with a malicious model corresponding to a malicious call event comprised in a preset malicious model library; and
   determining the call to be a malicious call if the malicious model that matches with the call detail record information of the call is found,
   wherein the malicious model corresponding to the malicious call event describes a process in which a lawbreaker commits a malicious behavior by using the malicious call, and defines a malicious condition that the malicious behavior meets.

2. The method according to claim 1, the matching the call detail record information of the call with a malicious model corresponding to a malicious call event comprised in a preset malicious model library comprising:
   extracting a malicious condition from a first malicious model, the first malicious model being any malicious model in the preset malicious model library;
   determining whether the call detail record information of the call satisfies the malicious condition; and
   determining that the call detail record information of the call matches with the first malicious model if the call detail record information of the call satisfies the malicious condition.

3. The method according to claim 1, before the obtaining call detail record information of the call, further comprising:
- obtaining a peer end phone number of the peer end; and
- obtaining, according to the peer end phone number, phone numbers communicated with the peer end phone number and communication frequencies between the peer end phone number and each of the phone numbers respectively; and
- executing the step of obtaining call detail record information of the call, if the obtained communication frequencies do not exceed a preset threshold.

4. The method according to claim 3, the obtaining, according to the peer end phone number, phone numbers communicated with the peer end phone number and communication frequencies between the peer end phone number and each of the phone numbers respectively comprising:
- sending the peer end phone number to a server, so that the server obtains a call record of the peer end phone number according to the peer end phone number;
- receiving the call record of the peer end phone number, sent by the server, and obtaining from the call record of the peer end phone number, the phone numbers communicated with the peer end phone number; and
- counting, according to the call record of the peer end phone number, the communication frequencies between the peer end phone number and each of the phone numbers respectively.

5. The method according to claim 1, before the obtaining call detail record information of the call, further comprising:
- obtaining a peer end phone number of the peer end; and
- obtaining a quantity of buddy contacts of the peer end phone number according to the peer end phone number; and
- executing the step of obtaining the call detail record information of the call, if the quantity of buddy contacts of the peer end phone number does not exceed a preset quantity threshold.

6. The method according to claim 1, after the determining the call to be a malicious call, further comprising:
- displaying prompt information, the prompt information comprising the malicious model that matches with the call detail record information of the call.

7. A malicious call recognition apparatus, comprising:
- a first obtaining module, configured to obtain call detail record information of the call when a local end makes a call to a peer end, the call detail record information of the call comprising at least one of a call record of the local end within first preset duration that is closest to current time, and a call record of the peer end within the first preset duration that is closest to the current time;
- a matching module, configured to match the call detail record information of the call with a malicious model corresponding to a malicious call event comprised in a preset malicious model library; and
- a recognition module, configured to determine the call to be a malicious call if a malicious model that matches the call detail record information of the call is found, wherein the malicious model corresponding to the malicious call event describes a process in which a lawbreaker commits a malicious behavior by using the malicious call, and defines a malicious condition that the malicious behavior meets.

8. The apparatus according to claim 7, the matching module comprising:
- an extraction module, configured to extract a malicious condition from a first malicious model, the first malicious model being any malicious model in the preset malicious model library;
- a first determining module, configured to determine whether the call detail record information of the call satisfies the malicious condition; and
- a second determining unit, configured to determine that the call detail record information of the call matches with the first malicious model if the call detail record information of the call satisfies the malicious condition.

9. The apparatus according to claim 7, the apparatus further comprising:
- a second obtaining module, configured to obtain a peer end phone number of the peer end; and
- a third obtaining module, configured to obtain, according to the peer end phone number, phone numbers communicated with the peer end phone number and communication frequencies between the peer end phone number and each of the phone numbers respectively;
- the first obtaining module being configured to execute the step of obtaining call detail record information of the call, if the obtained communication frequencies do not exceed a preset threshold.

10. The apparatus according to claim 9, the third obtaining module comprising:
- a sending unit, configured to send the peer end phone number to a server, so that the server obtains a call record of the peer end phone number according to the peer end phone number;
- an obtaining unit, configured to receive the call record of the peer end phone number, sent by the server, and obtain from the call record of the peer end phone number, the phone numbers communicated with the peer end phone number; and
- a counting unit, configured to count, according to the call record of the peer end phone number, the communication frequencies between the peer end phone number and each of the phone numbers respectively.

11. The apparatus according to claim 7, the apparatus further comprising:
- a fourth obtaining module, configured to obtain a peer end phone number of the peer end; and
- a fifth obtaining module, configured to obtain a quantity of buddy contacts of the peer end phone number according to the peer end phone number;
- the first obtaining module being configured to execute the step of obtaining the call detail record information of the call, if the quantity of buddy contacts of the peer end phone number does not exceed a preset quantity threshold.

12. The apparatus according to claim 7, the apparatus further comprising:
- a display module, configured to display prompt information, the prompt information comprising the malicious model that matches with the call detail record information of the call.

13. A non-transitory computer readable storage medium, comprising a computer readable program stored thereon, wherein, when being executed, the computer readable program causes a computing device to implement a malicious call recognition method, the method comprising:
- obtaining call detail record information of the call when a local end makes a call to a peer end, the call detail record information of the call comprising at least one of a call record of the local end within first preset duration that is closest to current time, and a call record of the peer end within the first preset duration that is closest to the current time;

matching the call detail record information of the call with a malicious model corresponding to a malicious call event comprised in a preset malicious model library; and determining the call to be a malicious call if the malicious model that matches with the call detail record information of the call is found, wherein the malicious model corresponding to the malicious call event describes a process in which a lawbreaker commits a malicious behavior by using the malicious call, and defines a malicious condition that the malicious behavior meets.

14. The non-transitory computer readable storage medium according to claim 13, the matching the call detail record information of the call with a malicious model corresponding to a malicious call event comprised in a preset malicious model library comprising:

extracting a malicious condition from a first malicious model, the first malicious model being any malicious model in the preset malicious model library;

determining whether the call detail record information of the call satisfies the malicious condition; and determining that the call detail record information of the call matches with the first malicious model if the call detail record information of the call satisfies the malicious condition.

15. The non-transitory computer readable storage medium according to claim 13, before the obtaining call detail record information of the call, the method further comprising:

obtaining a peer end phone number of the peer end; and obtaining, according to the peer end phone number, phone numbers communicated with the peer end phone number and communication frequencies between the peer end phone number and each of the phone numbers respectively; and executing the step of obtaining call detail record information of the call, if the obtained communication frequencies do not exceed a preset threshold.

16. The non-transitory computer readable storage medium according to claim 15, the obtaining, according to the peer end phone number, phone numbers communicated with the peer end phone number and communication frequencies between the peer end phone number and each of the phone numbers respectively comprising:

sending the peer end phone number to a server, so that the server obtains a call record of the peer end phone number according to the peer end phone number;

receiving the call record of the peer end phone number, sent by the server, and obtaining from the call record of the peer end phone number, the phone numbers communicated with the peer end phone number; and counting, according to the call record of the peer end phone number, the communication frequencies between the peer end phone number and each of the phone numbers respectively.

17. The non-transitory computer readable storage medium according to claim 13, before the obtaining call detail record information of the call, the method further comprising:

obtaining a peer end phone number of the peer end; and obtaining a quantity of buddy contacts of the peer end phone number according to the peer end phone number; and executing the step of obtaining the call detail record information of the call, if the quantity of buddy contacts of the peer end phone number does not exceed a preset quantity threshold.

18. The non-transitory computer readable storage medium according to claim 13, after the determining the call to be a malicious call, the method further comprising:

displaying prompt information, the prompt information comprising the malicious model that matches with the call detail record information of the call.

19. The method according to claim 1, wherein:

the preset malicious model library comprises a suddenly-increased malicious model, a leader malicious model, and an event malicious model.

20. The method according to claim 1, wherein before the determining the call to be a malicious call if the malicious model that matches with the call detail record information of the call is found, further comprising:

downloading the preset malicious model library and storing the preset malicious model library, wherein every sixth preset duration, downloading a latest preset malicious model library, and updating the preset malicious model library stored to the latest preset malicious model library.

* * * * *